(12) United States Patent
Gong et al.

(10) Patent No.: US 10,932,248 B2
(45) Date of Patent: Feb. 23, 2021

(54) SIGNAL TRANSMISSION METHOD AND RELATED DEVICE

(71) Applicant: HUAWEI TECHNOLOGIES CO., LTD., Guangdong (CN)

(72) Inventors: Zhengwei Gong, Shanghai (CN); Chi Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/366,684

(22) Filed: Mar. 27, 2019

(65) Prior Publication Data

US 2019/0223167 A1 Jul. 18, 2019

Related U.S. Application Data

(63) Continuation of application No. PCT/CN2017/102915, filed on Sep. 22, 2017.

(30) Foreign Application Priority Data

Sep. 28, 2016 (CN) .......................... 201610859147.5

(51) Int. Cl.
*H04W 72/04* (2009.01)
*H04W 24/08* (2009.01)
(Continued)

(52) U.S. Cl.
CPC ........ *H04W 72/042* (2013.01); *H04B 17/345* (2015.01); *H04W 24/08* (2013.01);
(Continued)

(58) Field of Classification Search
CPC ... H04B 17/318; H04B 17/345; H04W 24/08; H04W 24/10; H04W 28/02;
(Continued)

(56) References Cited

U.S. PATENT DOCUMENTS 9,369,898 B2 * 6/2016 Chun ..................... H04J 11/005
9,491,714 B2 * 11/2016 Sun ....................... H04B 17/345
(Continued)

FOREIGN PATENT DOCUMENTS

CN 1567843 A 1/2005
CN 103517327 A 1/2014
(Continued)

OTHER PUBLICATIONS

International Search Report dated Dec. 13, 2017 in corresponding International Patent Application No. PCT/CN2017/102915 (8 pages).
(Continued)

*Primary Examiner* — Eric Nowlin
(74) *Attorney, Agent, or Firm* — Leydig, Voit & Mayer, Ltd.

(57) ABSTRACT

Embodiments of the present invention disclose a signal transmission method and a related device. The method includes: generating, by a transmit node, a first signal; and sending, by the transmit node, the first signal on a first resource, where a transmit power of the first signal is non-zero, the first signal is superimposed on a third signal sent on the first resource, and the third signal is used by a receive node to obtain a first interference power, where the transmit node sends no signal on a second resource, there is a fourth signal on the second resource, the fourth signal is used by the receive node to obtain a second interference power, and the first interference power and the second interference power are used to obtain an interference power of the transmit node on the receive node.

9 Claims, 6 Drawing Sheets

(51) Int. Cl.
- *H04B 17/345* (2015.01)
- *H04W 28/02* (2009.01)
- *H04W 76/27* (2018.01)
- *H04W 72/08* (2009.01)
- *H04B 17/318* (2015.01)

(52) U.S. Cl.
CPC ......... *H04W 28/02* (2013.01); *H04W 72/085* (2013.01); *H04W 76/27* (2018.02); *H04B 17/318* (2015.01)

(58) Field of Classification Search
CPC ........... H04W 72/0406; H04W 72/042; H04W 72/0446; H04W 72/082; H04W 72/1289; H04W 74/006; H04W 76/27; H04W 52/242

See application file for complete search history.

(56) References Cited

U.S. PATENT DOCUMENTS

| | | | |
|---|---|---|---|
| 9,609,537 B2* | 3/2017 | Geirhofer | H04W 72/042 |
| 9,713,026 B2* | 7/2017 | Gaal | H04B 7/2656 |
| 9,774,432 B2* | 9/2017 | Xia | H04L 1/00 |
| 9,781,638 B2* | 10/2017 | Davydov | H04L 1/1812 |
| 9,807,763 B2* | 10/2017 | Song | H04W 24/10 |
| 9,867,176 B2* | 1/2018 | Li | H04W 72/042 |
| 9,936,494 B2* | 4/2018 | Geirhofer | H04L 5/005 |
| 9,979,503 B2* | 5/2018 | Zhao | H04L 25/03968 |
| 9,980,162 B2* | 5/2018 | Zhang | H04W 24/00 |
| 10,038,541 B2* | 7/2018 | Xia | H04L 5/005 |
| 10,154,499 B2* | 12/2018 | Lee | H04W 72/0486 |
| 10,644,845 B2* | 5/2020 | Yang | H04W 16/18 |
| 2012/0213261 A1 | 8/2012 | Sayana et al. | |
| 2013/0208604 A1 | 8/2013 | Lee et al. | |
| 2014/0073313 A1 | 3/2014 | Hammarwall et al. | |
| 2014/0092760 A1* | 4/2014 | Geirhofer | H04W 72/0413 370/252 |
| 2014/0112216 A1* | 4/2014 | Seo | H04L 5/14 370/280 |
| 2014/0146756 A1* | 5/2014 | Sahin | H04L 5/0055 370/329 |
| 2014/0341051 A1* | 11/2014 | Gaal | H04W 24/10 370/252 |
| 2015/0133137 A1* | 5/2015 | Lee | H04W 72/0486 455/452.1 |
| 2015/0200760 A1* | 7/2015 | Xia | H04L 1/20 370/252 |
| 2015/0230220 A1* | 8/2015 | Li | H04L 5/0053 370/329 |
| 2015/0296462 A1* | 10/2015 | Sun | H04L 1/00 370/338 |
| 2015/0333877 A1* | 11/2015 | Rahman | H04L 1/1812 370/280 |
| 2016/0050601 A1 | 2/2016 | Jeong et al. | |
| 2016/0057642 A1* | 2/2016 | Zhang | H04W 36/0094 370/252 |
| 2016/0105248 A1* | 4/2016 | Lunttila | H04B 17/345 370/252 |
| 2016/0277942 A1* | 9/2016 | Chande | H04W 24/02 |
| 2017/0006492 A1* | 1/2017 | Khoshnevisan | H04L 5/0073 |
| 2017/0126439 A1 | 5/2017 | Yoshimoto et al. | |
| 2017/0164339 A1* | 6/2017 | Geirhofer | H04W 72/0413 |
| 2017/0373811 A1* | 12/2017 | Xia | H04W 72/1273 |
| 2018/0092088 A1* | 3/2018 | Song | H04L 1/0026 |
| 2018/0323887 A1* | 11/2018 | Azarian Yazdi | H04L 5/0007 |
| 2018/0323916 A1* | 11/2018 | Yang | H04W 16/18 |
| 2018/0367346 A1* | 12/2018 | Chen | H04B 17/345 |
| 2019/0132023 A1* | 5/2019 | Tokgoz | H04B 1/711 |
| 2019/0260486 A1* | 8/2019 | Kang | H04L 5/0007 |
| 2019/0313418 A1* | 10/2019 | Wang | H04L 5/0035 |
| 2019/0364449 A1* | 11/2019 | Yang | H04W 24/10 |
| 2020/0053661 A1* | 2/2020 | Yang | H04W 72/046 |
| 2020/0106593 A1* | 4/2020 | Wu | H04J 11/005 |
| 2020/0112420 A1* | 4/2020 | Xu | H04W 88/10 |
| 2020/0137738 A1* | 4/2020 | Liu | H04L 5/0064 |

FOREIGN PATENT DOCUMENTS

| | | | | |
|---|---|---|---|---|
| CN | 103733676 A | | 4/2014 | |
| CN | 104919849 A | | 9/2015 | |
| CN | 105144622 A | | 12/2015 | |
| CN | 105723640 A | | 6/2016 | |
| CN | 105763350 A | | 7/2016 | |
| CN | 109219970 A | * | 1/2019 | ............ H04J 11/005 |
| CN | 110622445 A | * | 12/2019 | ........ H04W 72/0446 |
| EP | 3619840 A1 | * | 3/2020 | ........... H04L 5/0048 |
| WO | 2013166712 A1 | | 11/2013 | |
| WO | 2015166769 A1 | | 11/2015 | |
| WO | 2016095533 A1 | | 6/2016 | |
| WO | WO-2018202144 A1 | * | 11/2018 | ............. H04L 1/248 |
| WO | WO-2018204098 A1 | * | 11/2018 | ........... H04L 5/0073 |
| WO | WO-2019001684 A1 | * | 1/2019 | .......... H04W 72/082 |
| WO | WO-2019032021 A1 | * | 2/2019 | ........... H04B 17/345 |
| WO | WO-2019083685 A1 | * | 5/2019 | ............. H04B 1/711 |
| WO | WO-2019173068 A1 | * | 9/2019 | ............ H04W 24/08 |
| WO | WO-2019232690 A1 | * | 12/2019 | ............ H04W 24/10 |
| WO | WO-2020032666 A1 | * | 2/2020 | ........... H04L 27/26 |
| WO | WO-2020037587 A1 | * | 2/2020 | ............ H04W 16/10 |

OTHER PUBLICATIONS

Written Opinion of the International Searching Authority dated Dec. 13, 2017 in corresponding International Patent Application No. PCT/CN2017/102915 (5 pages).

International Search Report dated Dec. 13, 2017 in corresponding International Patent Application No. PCT/CN2017/102915.

"3rd Generation Partnership Project; Technical Specification Group GSM/EDGE Radio Access Network; Radio transmission and reception (Release 12)," 3GPP TS 45.005 V12.5.0, pp. 1-271, 3rd Generation Partnership Project, Valbonne, France (Mar. 2015).

* cited by examiner

SIGNAL TRANSMISSION METHOD AND RELATED DEVICE

CROSS-REFERENCE TO RELATED APPLICATIONS

This application is a continuation of International Application No. PCT/CN2017/102915, filed on Sep. 22, 2017, which claims priority to Chinese Patent Application No. 201610859147.5, filed on Sep. 28, 2016. The disclosures of the aforementioned applications are hereby incorporated by reference in their entireties.

TECHNICAL FIELD

The present disclosure relates to the field of wireless communications technologies, and in particular, to a signal transmission method and a related device.

BACKGROUND

With development of wireless network technologies, various new services emerge one after another, and different services also have varying resource requirements. This requires that a limited resource be more efficiently used in a future wireless network. To achieve such an objective, a dynamic time division duplex (D-TDD) technology has attracted more attention. D-TDD means that an uplink-downlink subframe configuration can be flexibly adjusted in a network, to be specific, a TDD uplink-downlink subframe configuration can be dynamically adjusted in the network based on requirements of different services on uplink and downlink resources, to optimize resource utilization.

Figure 1:
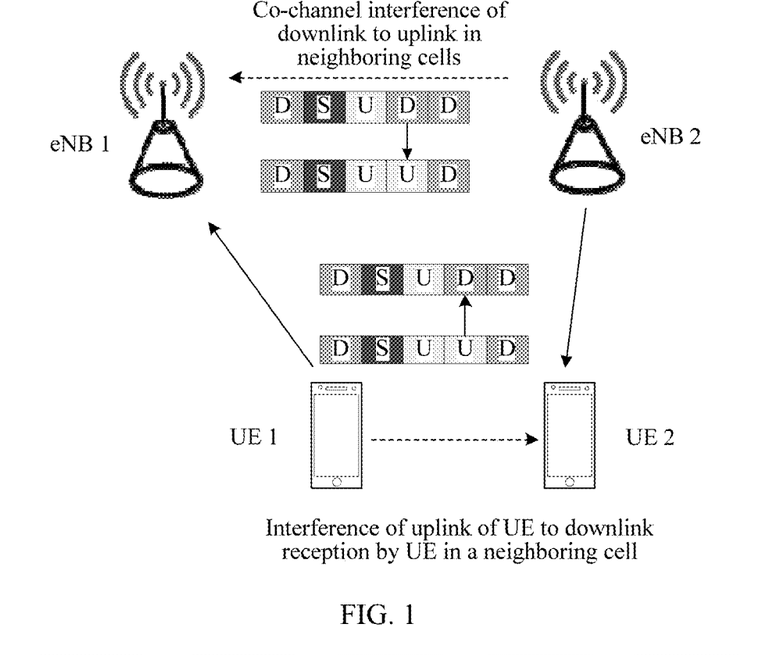
FIG. 1 is a schematic diagram showing that co-channel cross interference exists between a same type of nodes in a wireless network system in the prior art.

However, in a wireless network system using the D-TDD technology, as shown in FIG. 1, for a same type of nodes in the wireless network system, co-channel cross interference exists between neighboring cells. The co-channel cross interference specifically includes interference of downlink transmission by a co-channel base station (for example, an evolved NodeB eNB 2 in FIG. 1) serving a neighboring cell of a cell to uplink reception by a base station (for example, an eNB 1 in FIG. 1) serving the cell, and interference of uplink transmission by user equipment UE (for example, UE 1 in FIG. 1) in the neighboring cell to downlink reception by UE (for example, UE 2 in FIG. 1) in the cell.

The co-channel cross interference severely affects performance of the wireless network system, and limits a gain brought by the D-TDD technology. Therefore, in the wireless network system using the D-TDD technology, technologies such as interference identification, interference suppression, and interference coordination need to be studied.

SUMMARY

Embodiments of the present invention provide a signal transmission method and a related device, to determine an interference power of a transmit node on a receive node by using a measured first interference power and a measured second interference power, thereby eliminating impact of an interference power of signal sending by another node device, and helping accurately determine the interference power of the transmit node on the receive node.

According to a first aspect, an embodiment of the present invention provides a signal transmission method, including:
generating, by a transmit node, a first signal; and
sending, by the transmit node, the first signal on a first resource, where a transmit power of the first signal is non-zero, the first signal is superimposed on a third signal sent on the first resource, and the third signal is used by a receive node to obtain a first interference power, where
the transmit node sends no signal on a second resource, there is a fourth signal on the second resource, the fourth signal is used by the receive node to obtain a second interference power, and the first interference power and the second interference power are used to obtain an interference power of the transmit node on the receive node.

With reference to the first aspect, in some possible implementations, that the transmit node sends no signal on a second resource includes:
the transmit node sends a second signal on the second resource, where a transmit power of the second signal is zero.

With reference to the first aspect, in some possible implementations, the transmit node is first user equipment in a first cell, and the receive node is second user equipment in a second cell; and the method further includes:
receiving, by the transmit node, sending resource configuration information that is sent by a third network device in the first cell, where the sending resource configuration information is used to instruct the transmit node to send the first signal on the first resource and send no signal on the second resource.

With reference to the first aspect, in some possible implementations, receiving resource configuration information sent by a fourth network device in the second cell to the receive node is used to instruct the receive node to measure the third signal on the first resource and measure the fourth signal on the second resource.

With reference to the first aspect, in some possible implementations, the first cell and the second cell are a same cell.

With reference to the first aspect, in some possible implementations, the first cell and the second cell are a same cell, and the third network device and the fourth network device are a same network device.

With reference to the first aspect, in some possible implementations, the sending resource configuration information is user equipment-specific information, and the sending resource configuration information includes physical layer downlink control information or Radio Resource Control signaling.

With reference to the first aspect, in some possible implementations, the transmit node is a first network device in a first cell, the receive node is a second network device in a second cell, and the first cell and the second cell are neighboring cells; and the method further includes:
sending, by the transmit node, receiving resource configuration information to the receive node, where the receiving resource configuration information is used to instruct the receive node to measure the third signal on the first resource and measure the fourth signal on the second resource.

According to a second aspect, an embodiment of the present invention provides a signal transmission method, including:
measuring, by a receive node, a third signal on a first resource, to obtain a first interference power, where a first signal sent by a transmit node on the first resource is superimposed on the third signal, and a transmit power of the first signal is non-zero; and
measuring, by the receive node, a fourth signal on a second resource, to obtain a second interference power, where the first interference power and the second interference power are used to obtain an interference power of the transmit node on the receive node, where
the transmit node sends no signal on the second resource.

With reference to the second aspect, in some possible implementations, the transmit node is first user equipment in a first cell, and the receive node is second user equipment in a second cell; and the method further includes:

receiving, by the receive node, receiving resource configuration information that is sent by a fourth network device in the second cell, where the receiving resource configuration information is used to instruct the receive node to measure the third signal on the first resource and measure the fourth signal on the second resource.

With reference to the second aspect, in some possible implementations, sending resource configuration information sent by a third network device in the first cell to the transmit node is used to instruct the transmit node to send the first signal on the first resource and send no signal on the second resource.

With reference to the second aspect, in some possible implementations, the first cell and the second cell are a same cell.

With reference to the second aspect, in some possible implementations, the first cell and the second cell are a same cell, and the third network device and the fourth network device are a same network device.

With reference to the second aspect, in some possible implementations, the sending resource configuration information is user equipment-specific information, and the sending resource configuration information includes physical layer downlink control information or Radio Resource Control signaling.

With reference to the second aspect, in some possible implementations, the receiving resource configuration information is user equipment-specific information, or user equipment group-specific information, or cell-specific information; and when the receiving resource configuration information is user equipment-specific information or user equipment group-specific information, the receiving resource configuration information includes physical layer downlink control information or Radio Resource Control signaling; or when the receiving resource configuration information is cell-specific information, the receiving resource configuration information includes physical layer downlink control information, or Radio Resource Control signaling, or a system broadcast message.

With reference to the second aspect, in some possible implementations, the transmit node is a first network device in a first cell, the receive node is a second network device in a second cell, and the first cell and the second cell are neighboring cells; and the method further includes:

receiving, by the receive node, receiving resource configuration information sent by the transmit node, where the receiving resource configuration information is used to instruct the receive node to measure the third signal on the first resource and measure the fourth signal on the second resource.

According to a third aspect, an embodiment of the present invention provides a transmit node. The transmit node includes functional modules, where the functional modules are configured to perform some or all of the steps described in any one of the methods according to the first aspect of the embodiments of the present invention.

According to a fourth aspect, an embodiment of the present invention provides a receive node. The receive node includes functional modules, where the functional modules are configured to perform some or all of the steps described in any one of the methods according to the second aspect of the embodiments of the present invention.

According to a fifth aspect, an embodiment of the present invention provides a transmit node, including: a processor, a memory, a communications interface, and a bus, where the processor, the memory, and the communications interface are connected and complete mutual communication by using the bus;

the communications interface is configured to communicate with a network device, and the memory stores executable program code; and the processor is configured to invoke the executable program code, to perform some or all of the steps described in any one of the methods according to the first aspect of the embodiments of the present invention.

According to a sixth aspect, an embodiment of the present invention provides a receive node, including: a processor, a memory, a communications interface, and a bus, where the processor, the memory, and the communications interface are connected and complete mutual communication by using the bus;

the communications interface is configured to communicate with a network device, and the memory stores executable program code; and the processor is configured to invoke the executable program code, to perform some or all of the steps described in any one of the methods according to the second aspect of the embodiments of the present invention.

According to a seventh aspect, an embodiment of the present invention provides a computer-readable storage medium. The computer-readable storage medium stores program code. The program code includes an instruction used to perform some or all of the steps described in any one of the methods according to the first aspect of the embodiments of the present invention.

According to an eighth aspect, an embodiment of the present invention provides a computer-readable storage medium. The computer-readable storage medium stores program code. The program code includes an instruction used to perform some or all of the steps described in any one of the methods according to the second aspect of the embodiments of the present invention.

In addition, with reference to any one of the foregoing aspects, in some possible implementations, the first resource and the second resource are resources in a resource pool, the resource pool is a resource pool in a preset resource pool set, and a resource pool in the preset resource pool set periodically appears in time domain.

According to the signal transmission method provided in the embodiments of the present invention, the third signal on which the first signal sent by the transmit node is superimposed and the fourth signal on which the second signal sent by the transmit node is superimposed are measured by the receive node, to obtain the first interference power and the second interference power respectively. The transmit power of the first signal is non-zero and the transmit power of the second signal is zero, and in a signal in the third signal other than the first signal and a signal in the fourth signal other than the second signal, signals sent by another same node device have a same interference power when the signals are measured by the receive node. Therefore, a subtractive operation is performed on the first interference power and the second interference power, to eliminate impact of the interference power of the another node device on the receive node. To be specific, according to the signal transmission method provided in the embodiments of the present invention, the interference power of the transmit node on the receive node can be accurately determined without affecting resource occupation of the first resource and the second resource by the another node device.

BRIEF DESCRIPTION OF DRAWINGS

To describe the embodiments of the present invention more clearly, the following briefly introduces the accompanying drawings required for describing the embodiments or the prior art.

DESCRIPTION OF EMBODIMENTS

The following describes the technical solutions in the embodiments of the present invention with reference to the accompanying drawings in the embodiments of the present invention.

Figure 2:
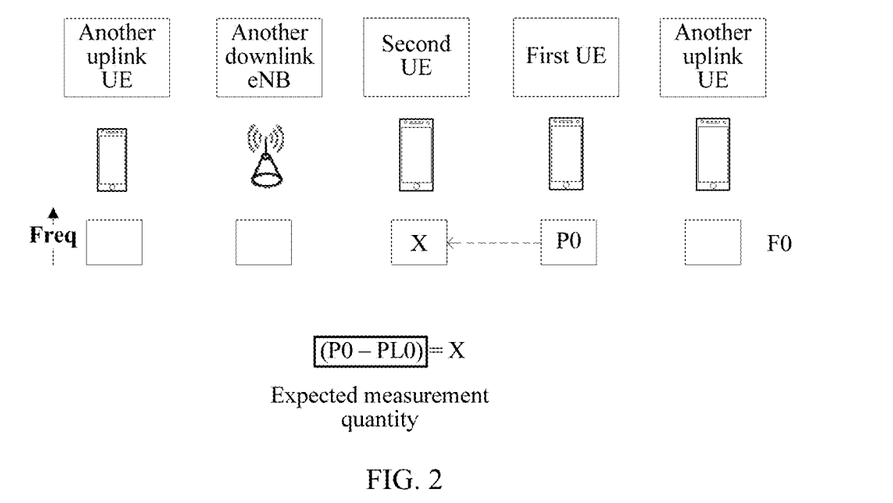
FIG. 2 is a schematic diagram of a resource configuration solution used when two UEs in an existing wireless network system using a D-TDD technology measure an interference intensity in the prior art.
Figure 3:
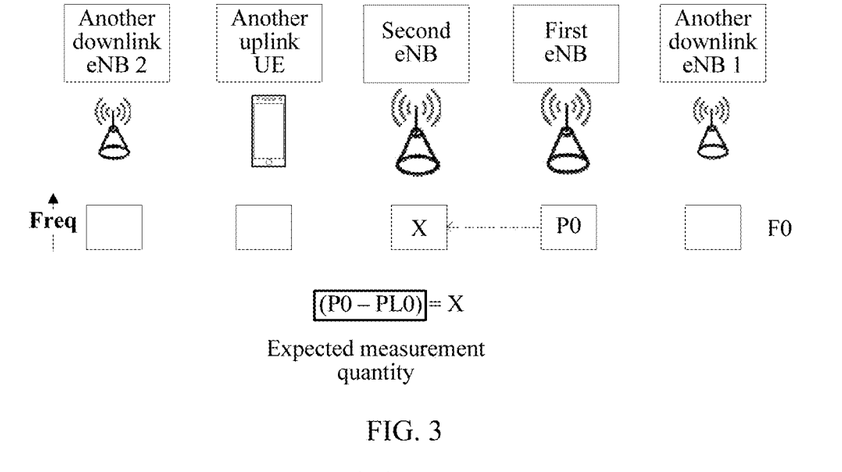
FIG. 3 is a schematic diagram of a resource configuration solution used when two eNBs in an existing wireless network system using a D-TDD technology measure an interference intensity in the prior art.

For ease of understanding of the technical solutions in the embodiments of the present invention, a resource configuration solution used when large-scale interference intensity measurement is performed in the prior art is described first. In the existing resource configuration solution used when large-scale interference intensity measurement is performed, a "clean" resource is configured for a transmit node (first user equipment (User Equipment, UE)/a first evolved NodeB (Evolved NodeB, eNB)/a transmission reception node (Transmission Reception Point, TRP)) transmitting an interference measurement signal, so that the interference measurement signal from the transmit node that is measured on the resource can accurately reflect an interference intensity generated by the transmit node. Specifically, FIG. 2 is a schematic diagram of a resource configuration solution used when first UE and second UE in neighboring cells in an existing wireless network system using a dynamic time division duplex (Dynamic Time Division Duplexing, D-TDD) technology perform large-scale interference intensity measurement, and FIG. 3 is a schematic diagram of a resource configuration solution used when a first eNB and a second eNB serving neighboring cells in an existing wireless network system using a D-TDD technology perform large-scale interference intensity measurement, where P0 is a transmit power of an interference measurement signal, and PL0 is large-scale fading that the interference measurement signal is subject to when the interference measurement signal arrives at the receive node. In FIG. 2 and FIG. 3, a network device in the wireless network system configures a resource F0 in frequency domain for a transmit node of the interference measurement signal. The resource F0 is used to transmit the interference measurement signal. Correspondingly, a receive node of the interference measurement signal receives the interference measurement signal on the resource F0, and measures energy of the interference measurement signal. It should be noted that, the resource F0 needs to be "clean" for the transmit node of the interference measurement signal. To be specific, the resource F0 cannot be occupied by another node to send another signal, to ensure that the interference measurement signal can accurately reflect interference intensity.

It can be learned that, another UE/eNB in the wireless network system in the prior art cannot occupy the "clean" resource F0; otherwise, measurement accuracy cannot be ensured. In this way, from a perspective of the another UE/eNB, a waste of resources is caused, and great limitations are imposed on transmission by the another UE/eNB.

Figure 4:
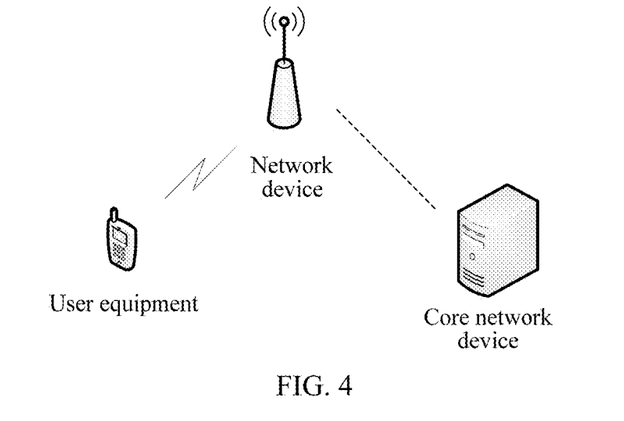
FIG. 4 is a system architectural diagram of an example of a communications system according to an embodiment of the present invention.

In view of the prior art, embodiments of the present invention provide a signal transmission method and a related device. FIG. 4 is a system architectural diagram of an example of a communications system according to an embodiment of the present invention. The communications system includes a core network device, a network device, and user equipment. The example of the communications system, for example, may be an existing Long Term Evolution (Long Term Evolution, LTE) communications system, or may be a future communications system using a fifth-generation network (5th Generation, 5G) new air interface (New Air Interfaces, NR) technology. Using the LTE communications system as an example, the core network device, for example, may include a mobility management entity (Mobility Management Entity, MME) or a serving gateway (Serving GateWay, S-GW). The MME is mainly responsible for a signaling processing part, namely, a control plane function, including an access control function, a mobility management function, an attach and detach function, a session management function, a gateway selection function, and the like. The S-GW is mainly responsible for a user plane function of user data forwarding, to be specific, routing and forwarding a data packet under control of the MME. The network device, for example, may be an LTE base station, namely, an evolved NodeB (Evolved NodeB, eNodeB), or may be a base station in a future 5G network, for example, a transmission reception node TRP. The network device is mainly responsible for at least one of a radio resource management function on an air interface side, a quality of service (Quality of Service, QoS) management function, a data compression and encryption function, and the like. On a core network side, the eNodeB is mainly responsible for forwarding control plane signaling to the MME and forwarding user plane service data to the S-GW. The user equipment UE, for example, may include a handheld device having a wireless communication function, an in-vehicle device, a wearable device, a computing device, another processing device connected to a wireless modem, a mobile station (Mobile station, MS), or terminal equipment (Terminal Equipment). For ease of description, in this application, the user equipment UE is referred to as user equipment or UE for short.

The following describes the embodiments of the present invention in detail with reference to the accompanying drawings, so that a person skilled in the art has a better understanding.

Figure 5:
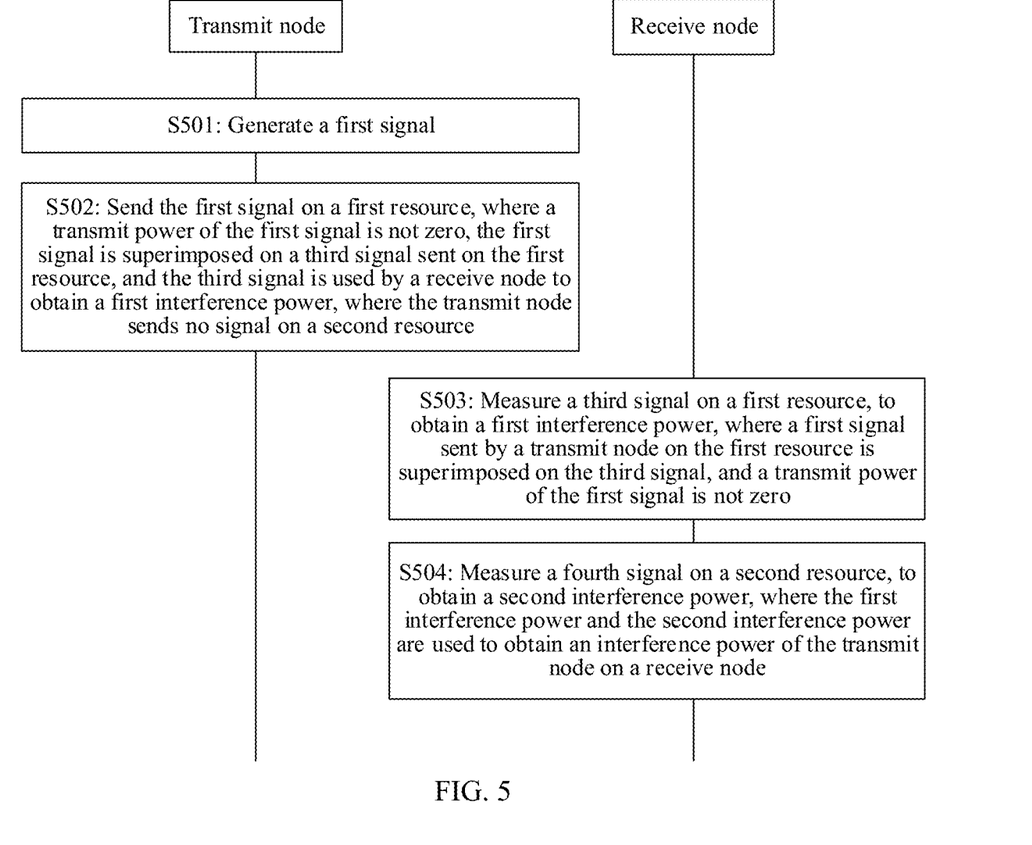
FIG. 5 is a schematic flowchart of a signal transmission method according to an embodiment of the present invention.

As shown in FIG. 5, a signal transmission method provided in an embodiment of the present invention includes the following steps.

S501: The transmit node generates a first signal.

S502: The transmit node sends the first signal on a first resource, where a transmit power of the first signal is non-zero, the first signal is superimposed on a third signal sent on the first resource, and the third signal is used by a receive node to obtain a first interference power.

The transmit node sends no signal on a second resource, there is a fourth signal on the second resource, the fourth signal is used by the receive node to obtain a second interference power, and the first interference power and the second interference power are used to obtain an interference power of the transmit node on the receive node.

That the transmit node sends no signal on the second resource may also be expressed as that: the transmit node sends a second signal on the second resource, where a transmit power of the second signal is zero.

The transmit node is first user equipment, and the receive node is second user equipment; or the transmit node is a first network device, and the receive node is a second network device. In other words, in some scenarios, user equipment may be equivalent to a network device.

An essential difference between the first signal and the second signal lies in whether there is energy. When the first resource includes only the first signal used to measure the interference power and the second resource includes only the second signal used to measure the interference power, because the transmit power of the second signal is zero, the transmit node sends no signal on the second resource. When the first resource and the second resource further include another signal not used to measure an interference power, although the transmit power of the second signal is zero, a transmit power of the another signal is non-zero; and although the transmit node sends no signal on the second resource, the another signal is still sent on the second resource.

Dimensions of the first resource and the second resource, for example, may be at least one of the following dimensions: a frequency domain dimension, a time domain dimension, a code domain dimension, and a spatial domain dimension. This is not uniquely limited in this embodiment of the present invention. Either of the first resource and the second resource can be distributed on minimum resource allocation unit. For example, in an LTE system, the first resource can be distributed on resource block (Resource Block, RB). Preferably, from a perspective of another transmit node, to ensure that the transmit power of the first signal on the first resource and the transmit power of the second signal on the second resource are as constant as possible, for the first resource and the second resource, a moment at which there may be a significant difference between the transmit powers, for example, a moment at which a cell-specific reference signal (Cell-specific Reference Signal, CRS) is sent in the LTE system, can be avoided.

S503: The receive node measures a third signal on a first resource, to obtain a first interference power, where a first signal sent by a transmit node on the first resource is superimposed on the third signal, and a transmit power of the first signal is non-zero.

S504: The receive node measures a fourth signal on a second resource, to obtain a second interference power, where the first interference power and the second interference power are used to obtain an interference power of the transmit node on the receive node.

The transmit node sends no signal on the second resource.

It can be learned that, according to the signal transmission method provided in this embodiment of the present invention, the third signal on which the first signal sent by the transmit node is superimposed and the fourth signal on which the second signal sent by the transmit node is superimposed are measured by the receive node, to obtain the first interference power and the second interference power respectively. The transmit power of the first signal is non-zero and the transmit power of the second signal is zero, and in a signal in the third signal other than the first signal and a signal in the fourth signal other than the second signal, signals sent by another same node device have a same interference power when the signals are measured by the receive node. Therefore, a subtractive operation is performed on the first interference power and the second interference power, to eliminate impact of the interference power of the another node device on the receive node. To be specific, according to the signal transmission method provided in this embodiment of the present invention, the interference power of the transmit node on the receive node can be accurately determined without affecting resource occupation of the first resource and the second resource by the another node device.

Optionally, in some possible implementations, the transmit node is first user equipment in a first cell, and the receive node is second user equipment in a second cell; and the transmit node further performs the following operation:

receiving, by the transmit node, sending resource configuration information that is sent by a third network device in the first cell, where the sending resource configuration information is used to instruct the transmit node to send the first signal on the first resource and send no signal on the second resource.

Optionally, receiving resource configuration information sent by a fourth network device in the second cell to the receive node is used to instruct the receive node to measure the third signal on the first resource and measure the fourth signal on the second resource.

Optionally, in some possible implementations, the transmit node is first user equipment in a first cell, and the receive node is second user equipment in a second cell; and the receive node further performs the following operation:

receiving, by the receive node, receiving resource configuration information that is sent by a fourth network device in the second cell, where the receiving resource configuration information is used to instruct the receive node to measure the third signal on the first resource and measure the fourth signal on the second resource.

Optionally, sending resource configuration information sent by a third network device in the first cell to the transmit node is used to instruct the transmit node to send the first signal on the first resource and send no signal on the second resource.

In a communications system using a full-duplex technology, the first cell and the second cell are a same cell, and the third network device and the fourth network device may be a same network device.

In addition, the sending resource configuration information is user equipment-specific information, and the sending resource configuration information includes physical layer downlink control information or Radio Resource Control signaling.

The receiving resource configuration information is user equipment-specific (UE-specific information), or user equipment group-specific (UE-group-common information), or cell-specific (Cell-specific) information.

When the receiving resource configuration information is user equipment-specific information or user equipment group-specific information, the receiving resource configuration information includes physical layer downlink control information or Radio Resource Control signaling.

When the receiving resource configuration information is cell-specific information, the receiving resource configuration information includes physical layer downlink control information, or Radio Resource Control signaling, or a system broadcast message.

The user equipment-specific information is sent information specific to single UE, the user equipment group-specific information is sent information specific to a UE group including at least two UEs, and the cell-specific information is information sent in a broadcast manner in a cell. Similar explanations are already added to the embodiments.

Optionally, in some possible implementations, the transmit node is a first network device in a first cell, the receive node is a second network device in a second cell, and the first cell and the second cell are neighboring cells; and the transmit node further performs the following operation:

sending, by the transmit node, receiving resource configuration information to the receive node, where the receiving resource configuration information is used to instruct the receive node to measure the third signal on the first resource and measure the fourth signal on the second resource.

The receiving resource configuration information may also be preconfigured, for example, may be hard-coded in the receive node.

Optionally, in some possible implementations, the transmit node is a first network device in a first cell, the receive node is a second network device in a second cell, and the first cell and the second cell are neighboring cells; and the receive node further performs the following operation:

receiving, by the receive node, receiving resource configuration information sent by the transmit node, where the receiving resource configuration information is used to instruct the receive node to measure the third signal on the first resource and measure the fourth signal on the second resource.

In addition, optionally, in some possible implementations, the first resource and the second resource are resources in a resource pool, the resource pool is a resource pool in a preset resource pool set, and a resource pool in the preset resource pool set periodically appears in time domain.

It should be noted that, the signal transmission method described in this embodiment of the present invention is applicable to not only an application scenario of a single transmit node and a single receive node but also an application scenario of a single transmit node and a plurality of receive nodes, where to be specific, the single transmit node and each receive node can measure an interference power of the transmit node on a corresponding receive node by using the signal transmission method described in this embodiment of the present invention, or an application scenario of a plurality of transmit nodes and a single receive node, where to be specific, each transmit node and the single receive node can measure an interference power of a corresponding transmit node on the single receive node by using the signal transmission method described in this embodiment of the present invention. A specific application scenario including a receive node and a transmit node is not uniquely limited in this embodiment of the present invention.

The signal transmission method disclosed in the foregoing embodiment of the present invention is further described below with reference to a specific example of an application scenario.

Figure 6:
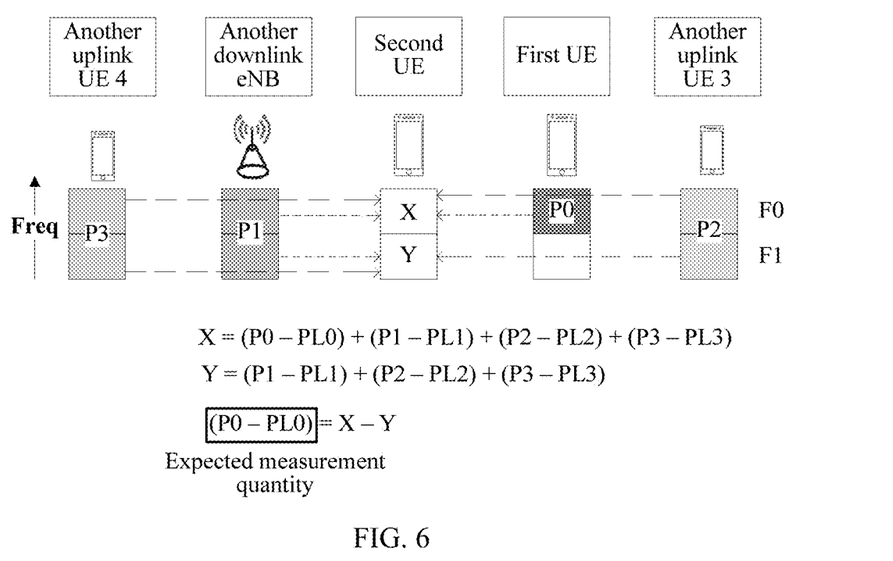
FIG. 6 is a schematic diagram of an example of an application scenario of a signal transmission method according to an embodiment of the present invention.

In an embodiment, referring to FIG. 6, assuming that the transmit node is first UE; the receive node is second UE; the first resource and the second resource are respectively F0 and F1; the transmit power of the first signal is P0, and a path loss is PL0; the transmit power of the second signal is 0; transmit powers of signals sent by another downlink eNB on the first resource and the second resource are P1, and a path loss is PL1; transmit powers of signals sent by another uplink UE 3 on the first resource and the second resource are P2, and a path loss is PL2; and transmit powers of signals sent by another uplink UE 4 on the first resource and the second resource are P3, and a path loss is PL3, the second UE can determine that the first interference power X and the second interference power Y are respectively:

$$X=(P0-PL0)+(P1-PL1)+(P2-PL2)+(P3-PL3); \text{ and}$$

$$Y=(P1-PL1)+(P2-PL2)+(P3-PL3).$$

Therefore, the second UE determines the interference power of the first UE on the second UE as:

$$X-Y=(PL0-P0).$$

Figure 7:
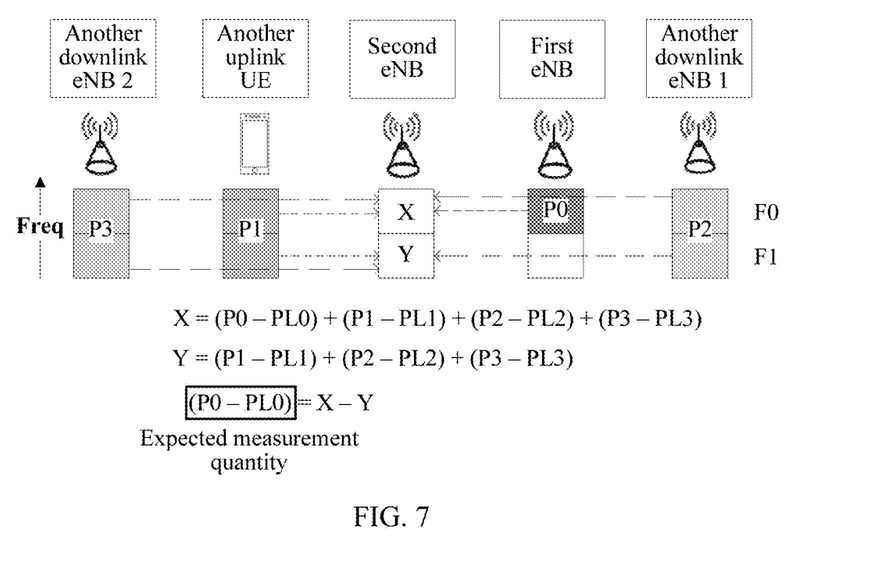
FIG. 7 is a schematic diagram of an example of an application scenario of another signal transmission method according to an embodiment of the present invention.

In another embodiment, referring to FIG. 7, assuming that the transmit node is a first eNB; the receive node is a second eNB; the first resource and the second resource are respectively F0 and F1; the transmit power of the first signal is P0, and a path loss is PL0; the transmit power of the second signal is 0; transmit powers of signals sent by another uplink UE on the first resource and the second resource are P1, and a path loss is PL1; transmit powers of signals sent by another downlink eNB 1 on the first resource and the second resource are P2, and a path loss is PL2; and transmit powers of signals sent by another downlink eNB 2 on the first resource and the second resource are P3, and a path loss is PL3, the second eNB can determine that the first interference power X and the second interference power Y are respectively:

$$X=(P0-PL0)+(P1-PL1)+(P2-PL2)+(P3-PL3); \text{ and}$$

$$Y=(P1-PL1)+(P2-PL2)+(P3-PL3).$$

Therefore, the second eNB determines the interference power of the first eNB on the second eNB as:

$$X-Y=(PL0-P0).$$

An apparatus for implementing the foregoing method in an embodiment of the present invention is described below with reference to the accompanying drawings.

Figure 8:
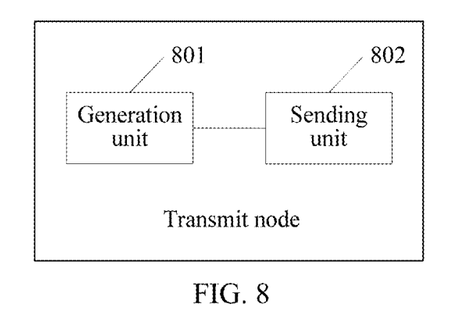
FIG. 8 is a block diagram of functional units of a transmit node according to an embodiment of the present invention.

FIG. 8 is a block diagram of functional units of a transmit node according to an embodiment of the present invention.

As shown in FIG. 8, the transmit node 800 may include a generation unit 801 and a sending unit 802.

The generation unit 801 is configured to generate a first signal.

The sending unit 802 is configured to send the first signal on a first resource, where a transmit power of the first signal is non-zero, the first signal is superimposed on a third signal sent on the first resource, and the third signal is used by a receive node to obtain a first interference power.

The sending unit sends no signal on a second resource, there is a fourth signal on the second resource, the fourth signal is used by the receive node to obtain a second interference power, and the first interference power and the second interference power are used to obtain an interference power of the transmit node on the receive node.

Optionally, the transmit node is first user equipment in a first cell, and the receive node is second user equipment in a second cell; and the transmit node further includes:

a receiving unit, configured to receive sending resource configuration information that is sent by a third network device in the first cell, where the sending resource configuration information is used to instruct the transmit node to send the first signal on the first resource and send no signal on the second resource.

In a communications system using a full-duplex technology, the first cell and the second cell are a same cell.

In addition, the sending resource configuration information is user equipment-specific information, and the sending resource configuration information includes physical layer downlink control information or Radio Resource Control signaling.

Optionally, the transmit node is a first network device in a first cell, the receive node is a second network device in a second cell, and the first cell and the second cell are neighboring cells; and the transmit node further includes:

a third sending unit, configured to send receiving resource configuration information to the receive node, where the receiving resource configuration information is used to instruct the receive node to measure the third signal on the first resource and measure the fourth signal on the second resource.

It should be noted that, the foregoing units (the sending unit 801) may be configured to perform related steps in the foregoing method embodiment.

In this embodiment, the transmit node 800 is presented in a form of a unit. Herein, the "unit" may be an application-specific integrated circuit (application-specific integrated circuit, ASIC), a processor and a memory that perform one or more software or firmware programs, an integrated logic circuit, and/or another device that can provide the foregoing function, for example, a receiver, a transmitter, a transceiver, or a processor. A person skilled in the art may learn that a composition form of the transmit node 800 may be specifically a transmit node shown in FIG. 10.

Figure 10:
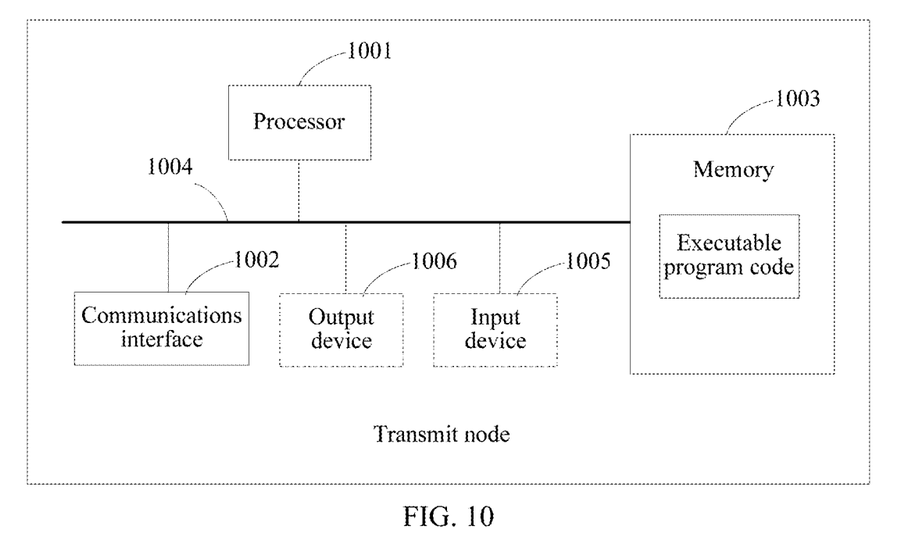
FIG. 10 is a schematic structural diagram of a transmit node according to an embodiment of the present invention.

For example, a function of the generation unit 801 may be implemented by a processor 1001 shown in FIG. 10, and a function of the sending unit 802 may be implemented by the processor 1001 and a communications interface 1002 shown in FIG. 10.

It can be learned that, according to the transmit node provided in this embodiment of the present invention, the third signal on which the first signal sent by the transmit node is superimposed and the fourth signal on which the second signal sent by the transmit node is superimposed are measured by the receive node, to obtain the first interference power and the second interference power respectively. The transmit power of the first signal is non-zero and the transmit power of the second signal is zero, and in a signal in the third signal other than the first signal and a signal in the fourth signal other than the second signal, signals sent by another same node device have a same interference power when the signals are measured by the receive node. Therefore, a subtractive operation is performed on the first interference power and the second interference power, to eliminate impact of the interference power of the another node device on the receive node. To be specific, according to the transmit node provided in this embodiment of the present invention, the interference power of the transmit node on the receive node can be accurately determined without affecting resource occupation of the first resource and the second resource by the another node device.

Figure 9:
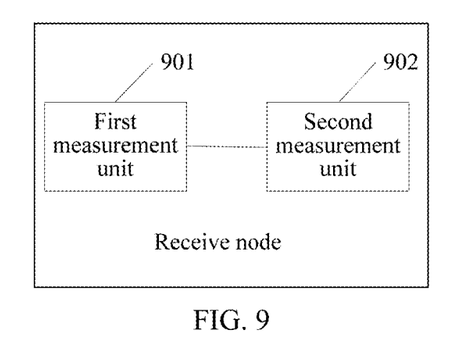
FIG. 9 is a block diagram of functional units of a receive node according to an embodiment of the present invention.

FIG. 9 is a block diagram of functional units of a receive node according to an embodiment of the present invention.

As shown in FIG. 9, the receive node 900 may include a first measurement unit 901 and a second measurement unit 902.

The first measurement unit 901 is configured to measure a third signal on a first resource, to obtain a first interference power, where a first signal sent by a transmit node on the first resource is superimposed on the third signal, and a transmit power of the first signal is non-zero.

The second measurement unit 902 is configured to measure a fourth signal on a second resource, to obtain a second interference power, where the first interference power and the second interference power are used to obtain an interference power of the transmit node on the receive node.

The transmit node sends no signal on the second resource.

Optionally, functions of the first measurement unit and the second measurement unit may be implemented by a processor.

Optionally, the transmit node is first user equipment in a first cell, and the receive node is second user equipment in a second cell; and the receive node further includes:

a first receiving unit, configured to receive receiving resource configuration information that is sent by a fourth network device in the second cell, where the receiving resource configuration information is used to instruct the receive node to measure the third signal on the first resource and measure the fourth signal on the second resource.

In a communications system using a full-duplex technology, the first cell and the second cell are a same cell.

In addition, the receiving resource configuration information is user equipment-specific information, or user equipment group-specific information, or cell-specific information.

Optionally, when the receiving resource configuration information is user equipment-specific information or user equipment group-specific information, the receiving resource configuration information includes physical layer downlink control information or Radio Resource Control signaling.

Optionally, when the receiving resource configuration information is cell-specific information, the receiving resource configuration information includes physical layer downlink control information, or Radio Resource Control signaling, or a system broadcast message.

Optionally, the transmit node is a first network device in a first cell, the receive node is a second network device in a second cell, and the first cell and the second cell are neighboring cells; and the receive node further includes:

a second receiving unit, configured to receive receiving resource configuration information sent by the transmit node, where the receiving resource configuration information is used to instruct the receive node to measure the third signal on the first resource and measure the fourth signal on the second resource.

It should be noted that, the foregoing units (the first measurement unit 901) are configured to perform related steps in the foregoing method.

In this embodiment, the receive node 900 is presented in a form of a unit. Herein, the "unit" may be an application-specific integrated circuit (application-specific integrated circuit, ASIC), a processor and a memory that perform one or more software or firmware programs, an integrated logic circuit, and/or another device that can provide the foregoing function, for example, a receiver, a transmitter, a transceiver, or a processor. A person skilled in the art may learn that a composition form of the receive node 900 may be specifically a receive node shown in FIG. 11.

Figure 11:
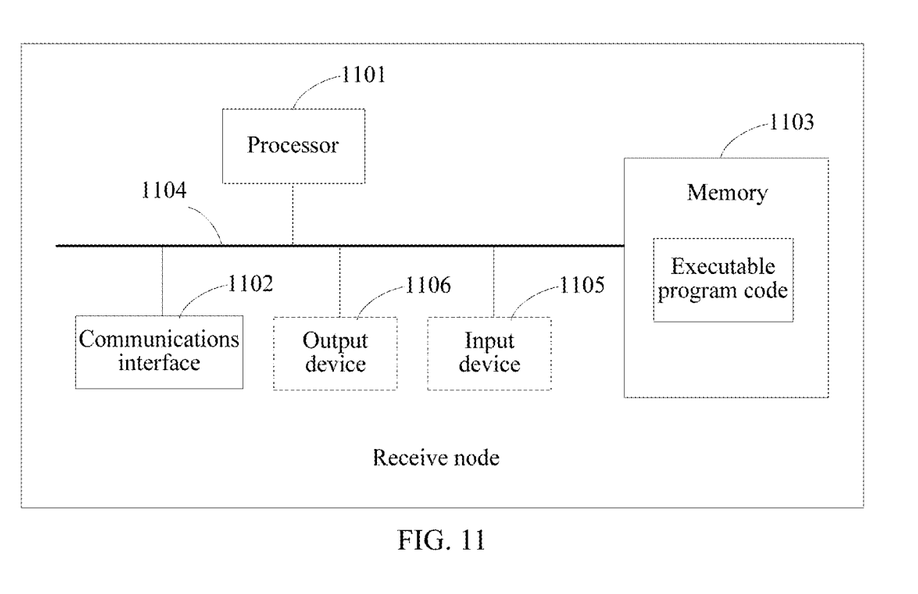
FIG. 11 is a schematic structural diagram of a receive node according to an embodiment of the present invention.

For example, a function of the first measurement unit 901 may be implemented by a processor 1101 and a communications interface 1102 shown in FIG. 11, and a function of the second measurement unit 902 may be implemented by the processor 1101 and the communications interface 1102 shown in FIG. 11.

It can be learned that, according to the receive node provided in this embodiment of the present invention, the third signal on which the first signal sent by the transmit node is superimposed and the fourth signal on which the second signal sent by the transmit node is superimposed are measured by the receive node, to obtain the first interference power and the second interference power respectively. The transmit power of the first signal is non-zero and the transmit power of the second signal is zero, and in a signal in the third signal other than the first signal and a signal in the fourth signal other than the second signal, signals sent by another same node device have a same interference power when the signals are measured by the receive node. Therefore, a subtractive operation is performed on the first interference power and the second interference power, to eliminate impact of the interference power of the another node device on the receive node. To be specific, according to the receive node provided in this embodiment of the present invention, the interference power of the transmit node on the receive node can be accurately determined without affecting resource occupation of the first resource and the second resource by the another node device.

FIG. 10 is a schematic structural diagram of a transmit node according to an embodiment of the present invention.

As shown in the figure, the transmit node provided in this embodiment of the present invention includes a processor 1001, a communications interface 1002, a memory 1003, and a bus 1004. The processor 1001, the communications interface 1002, and the memory 1003 are connected and complete mutual communication by using the bus 1004.

The communications interface 1002 is configured to communicate with a network device under control of the processor 1001. The memory 1003 stores executable program code.

The processor 1001 is configured to invoke the executable program code, to perform the following operations:

generating, by the transmit node, a first signal; and sending, by the transmit node, the first signal on a first resource, where a transmit power of the first signal is non-zero, the first signal is superimposed on a third signal sent on the first resource, and the third signal is used by a receive node to obtain a first interference power.

The transmit node sends no signal on a second resource, there is a fourth signal on the second resource, the fourth signal is used by the receive node to obtain a second interference power, and the first interference power and the second interference power are used to obtain an interference power of the transmit node on the receive node.

It can be learned that, according to the transmit node provided in this embodiment of the present invention, the third signal on which the first signal sent by the transmit node is superimposed and the fourth signal on which the second signal sent by the transmit node is superimposed are measured by the receive node, to obtain the first interference power and the second interference power respectively. The transmit power of the first signal is non-zero and the transmit power of the second signal is zero, and in a signal in the third signal other than the first signal and a signal in the fourth signal other than the second signal, signals sent by another same node device have a same interference power when the signals are measured by the receive node. Therefore, a subtractive operation is performed on the first interference power and the second interference power, to eliminate impact of the interference power of the another node device on the receive node. To be specific, according to the transmit node provided in this embodiment of the present invention, the interference power of the transmit node on the receive node can be accurately determined without affecting resource occupation of the first resource and the second resource by the another node device.

Optionally, the transmit node is first user equipment in a first cell, and the receive node is second user equipment in a second cell; and the processor 1001 is further configured to:

receive, by using the communications interface 1002, sending resource configuration information that is sent by a third network device in the first cell, where the sending resource configuration information is used to instruct the transmit node to send the first signal on the first resource and send no signal on the second resource.

Optionally, the first cell and the second cell are a same cell.

Optionally, the sending resource configuration information is user equipment-specific information, and the sending resource configuration information includes physical layer downlink control information or Radio Resource Control signaling.

Optionally, the transmit node is a first network device in a first cell, the receive node is a second network device in a second cell, and the first cell and the second cell are neighboring cells; and the processor 1001 is further configured to:

send, by using the communications interface 1002, receiving resource configuration information to the receive node, where the receiving resource configuration information is used to instruct the receive node to measure the third signal on the first resource and measure the fourth signal on the second resource.

It should be noted that, herein, the processor 1001 may be one processor or may be a general term of a plurality of processing elements. For example, the processor may be a central processing unit (Central Processing Unit, CPU), or may be an application-specific integrated circuit (Application Specific Integrated Circuit, ASIC), or may be one or more integrated circuits configured to implement the embodiments of the present invention, such as one or more microprocessors (digital signal processor, DSP) or one or more field programmable gate arrays (Field Programmable Gate Array, FPGA).

The communications interface 1002 may include one or more of an antenna, at least one amplifier, a transceiver, a coupler, an LNA (Low Noise Amplifier, low noise amplifier), and a duplexer. The communications interface 1004 may further communicate with the network device through wireless communication. The wireless communication may use any communication standard or protocol, including, but not limited to, GSM (Global System for Mobile communications, Global System for Mobile Communications), GPRS (General Packet Radio Service, general packet radio service), CDMA (Code Division Multiple Access, Code Division Multiple Access), WCDMA (Wideband Code Division Multiple Access, Wideband Code Division Multiple Access), LTE (Long Term Evolution, Long Term Evolution), email, SMS (Short Messaging Service, a short message service), and the like.

The memory 1003 may be one storage apparatus or may be a general term of a plurality of storage elements, and is configured to store executable program code, or parameters, data, and the like required for running of an access network management device. In addition, the memory 1003 may include a random access memory (RAM) or may include a non-volatile memory (non-volatile memory) such as a magnetic disk memory or a flash memory (Flash).

The bus 1004 may be an industry standard architecture (Industry Standard Architecture, ISA) bus, a peripheral component interconnect (Peripheral Component Interconnect, PCI) bus, an extended industry standard architecture (Extended Industry Standard Architecture, EISA) bus, or the like. The bus 1004 may be classified into an address bus, a data bus, a control bus, or the like. For ease of indication, the bus is indicated by using only one bold line in FIG. 10. However, it does not mean that there is only one bus or only one type of bus.

The transmit node may further include an input device 1005 and an output device 1006 that are connected to the bus 1004, to connect to other parts such as the processor 1001 by using the bus 1004.

In the embodiment shown in FIG. 7, functions of the units may be implemented based on a structure of the transmit node.

FIG. 11 is a schematic structural diagram of a receive node according to an embodiment of the present invention.

As shown in the figure, the receive node provided in this embodiment of the present invention includes a processor 1101, a communications interface 1102, a memory 1103, and a bus 1104. The processor 1101, the communications interface 1102, and the memory 1103 are connected and complete mutual communication by using the bus 1104.

The communications interface 1102 is configured to communicate with a network device under control of the processor 1101. The memory 1103 stores executable program code.

The processor 1101 is configured to invoke the executable program code, to perform the following operation:

measuring, by the receive node, a third signal on a first resource, to obtain a first interference power, where a first signal sent by a transmit node on the first resource is superimposed on the third signal, and a transmit power of the first signal is non-zero; and measuring, by the receive node, a fourth signal on a second resource, to obtain a second interference power, where the first interference power and the second interference power are used to obtain an interference power of the transmit node on the receive node.

The transmit node sends no signal on the second resource.

It can be learned that, according to the receive node provided in this embodiment of the present invention, the third signal on which the first signal sent by the transmit node is superimposed and the fourth signal on which the second signal sent by the transmit node is superimposed are measured by the receive node, to obtain the first interference power and the second interference power respectively. The transmit power of the first signal is non-zero and the transmit power of the second signal is zero, and in a signal in the third signal other than the first signal and a signal in the fourth signal other than the second signal, signals sent by another same node device have a same interference power when the signals are measured by the receive node. Therefore, a subtractive operation is performed on the first interference power and the second interference power, to eliminate impact of the interference power of the another node device on the receive node. To be specific, according to the receive node provided in this embodiment of the present invention, the interference power of the transmit node on the receive node can be accurately determined without affecting resource occupation of the first resource and the second resource by the another node device.

Optionally, the transmit node is first user equipment in a first cell, and the receive node is second user equipment in a second cell; and the processor 1101 is further configured to:

receive, by using the communications interface 1102, receiving resource configuration information that is sent by a fourth network device in the second cell, where the receiving resource configuration information is used to instruct the receive node to measure the third signal on the first resource and measure the fourth signal on the second resource.

Optionally, the first cell and the second cell are a same cell.

Optionally, the receiving resource configuration information is user equipment-specific information, or user equipment group-specific information, or cell-specific information.

Optionally, when the receiving resource configuration information is user equipment-specific information or user equipment group-specific information, the receiving resource configuration information includes physical layer downlink control information or Radio Resource Control signaling.

Optionally, when the receiving resource configuration information is cell-specific information, the receiving resource configuration information includes physical layer downlink control information, or Radio Resource Control signaling, or a system broadcast message.

Optionally, the transmit node is a first network device in a first cell, the receive node is a second network device in a second cell, and the first cell and the second cell are neighboring cells; and the processor 1101 is further configured to:

receive, by using the communications interface 1102, receiving resource configuration information sent by the transmit node, where the receiving resource configuration information is used to instruct the receive node to measure the third signal on the first resource and measure the fourth signal on the second resource.

It should be noted that, herein, the processor 1101 may be one processor or may be a general term of a plurality of processing elements. For example, the processor may be a central processing unit (Central Processing Unit, CPU), or may be an application-specific integrated circuit (Application Specific Integrated Circuit, ASIC), or may be one or more integrated circuits configured to implement the embodiments of the present invention, such as one or more microprocessors (digital signal processor, DSP) or one or more field programmable gate arrays (Field Programmable Gate Array, FPGA).

The communications interface 1102 may include one or more of an antenna, at least one amplifier, a transceiver, a coupler, an LNA (Low Noise Amplifier, low noise amplifier), and a duplexer. The communications interface 1104 may further communicate with the network device through wireless communication. The wireless communication may use any communication standard or protocol, including, but not limited to, GSM (Global System of Mobile communication, Global System for Mobile Communications), GPRS (General Packet Radio Service, general packet radio service), CDMA (Code Division Multiple Access, Code Division Multiple Access), WCDMA (Wideband Code Division Multiple Access, Wideband Code Division Multiple Access), LTE (Long Term Evolution, Long Term Evolution), email, SMS (Short Messaging Service, a short message service), and the like.

The memory 1103 may be one storage apparatus or may be a general term of a plurality of storage elements, and is configured to store executable program code, or parameters, data, and the like required for running of an access network management device. In addition, the memory 1003 may include a random access memory (RAM) or may include a non-volatile memory (non-volatile memory) such as a magnetic disk memory or a flash memory (Flash).

The bus 1104 may be an industry standard architecture (Industry Standard Architecture, ISA) bus, a peripheral component interconnect (Peripheral Component, PCI) bus, an extended industry standard architecture (Extended Industry Standard Architecture, EISA) bus, or the like. The bus 1104 may be classified into an address bus, a data bus, a control bus, or the like. For ease of indication, the bus is indicated by using only one bold line in FIG. 11. However, it does not mean that there is only one bus or only one type of bus.

The receive node may further include an input device 1105 and an output device 1106 that are connected to the bus 1104, to connect to other parts such as the processor 1101 by using the bus 1104.

In the embodiment shown in FIG. 8, functions of the units may be implemented based on a structure of the receive node.

In the embodiment shown in FIG. 5, method procedures of the steps may be implemented based on the structures of the transmit node shown in FIG. 10 and the receive node shown in FIG. 11.

An embodiment of the present invention further provides a computer-readable storage medium, configured to store a computer software instruction used by the foregoing receive node. The computer software instruction includes a program designed to perform the foregoing method embodiment. A signal can be transmitted by executing the stored program.

An embodiment of the present invention further provides a computer-readable storage medium, configured to store a computer software instruction used by the foregoing transmit node. The computer software instruction includes a program designed to perform the foregoing method embodiment. A signal can be transmitted by executing the stored program.

Although the present invention is described with reference to the embodiments, in a process of implementing the present invention that claims protection, a person skilled in the art may understand and implement other variations of the disclosed embodiments by viewing the accompanying drawings, disclosed content, and the accompanying claims. In the claims, "comprising" (comprising) does not exclude another component or another step, and "a" or "one" does not exclude a case of a plurality. A single processor or another unit may implement several functions enumerated in the claims. The fact that some measures are recited in mutually different dependent claims does not indicate that a combination of these measures cannot bring better effects.

A person skilled in the art should understand that the embodiments of the present invention may be provided as a method, an apparatus (device), or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code. The computer program is stored/distributed in an appropriate medium, provided with other hardware or as a part of hardware, or may be distributed in another form such as in the Internet or in another wired or wireless telecommunication system.

The present invention is described with reference to the flowcharts and/or block diagrams of the method, the apparatus (device), and the computer program product according to the embodiments of the present invention. It should be understood that computer program instructions may be used to implement each process and/or each block in the flowcharts and/or the block diagrams, and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specified function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

The embodiments of the present invention are described in detail above. The principle and implementations of the present invention are described herein through specific examples. The description about the embodiments of the present invention is merely provided to help understand the method and core ideas of the present invention. In addition, a person of ordinary skill in the art can make variations and modifications to the present invention in terms of the specific implementations and application scopes according to the ideas of the present invention. Therefore, the content of this specification shall not be construed as a limit to the present invention.

What is claimed is:

1. A method of signal transmission, comprising:
generating, by a transmit node, a first signal, wherein the transmit node is first user equipment in a first cell;
sending, by the transmit node, the first signal on a first resource, wherein a transmit power of the first signal is non-zero, the first signal is superimposed on a third signal sent on the first resource, and the third signal is used by a receive node to obtain a first interference power, wherein the receive node is second user equipment in a second cell, wherein the transmit node sends no signal on a second resource, there is a fourth signal on the second resource, the fourth signal is used by the receive node to obtain a second interference power, and the first interference power and the second interference power are used to obtain an interference power of the transmit node on the receive node; and receiving, by the transmit node, sending resource configuration information that is sent by a third network device in the first cell, wherein the sending resource configuration information instructs the transmit node to send the first signal on the first resource and send no signal on the second resource.

2. The method according to claim 1, wherein the first cell and the second cell are a same cell.

3. The method according to claim 1, wherein
the sending resource configuration information is user equipment-specific information, and the sending resource configuration information comprises physical layer downlink control information or Radio Resource Control signaling.

4. A transmit node, the transmit node being a first user equipment in a first cell and comprising:
a memory to store instructions; and
a processor to execute the instructions to cause the transmit node to execute operations comprising:
generating a first signal;
sending the first signal on a first resource, wherein a transmit power of the first signal is non-zero, the first signal is superimposed on a third signal sent on the first resource, and the third signal is used by a receive node to obtain a first interference power, wherein the receive node is second user equipment in a second cell;
sending no signal on a second resource, wherein there is a fourth signal on the second resource, the fourth signal is used by the receive node to obtain a second interference power, and the first interference power and the second interference power are used to obtain an interference power of the transmit node on the receive node; and
receiving sending resource configuration information from a third network device in the first cell, wherein the sending resource configuration information instructs the transmit node to send the first signal on the first resource and send no signal on the second resource.

5. The transmit node according to claim 4, wherein the first cell and the second cell are a same cell.

6. The transmit node according to claim 4, wherein
the sending resource configuration information is user equipment-specific information, and the sending resource configuration information comprises physical layer downlink control information or Radio Resource Control signaling.

7. A receive node, the receive node being a second user equipment in a second cell and comprising:
a memory to store instructions; and
a processor to execute the instructions to cause the receive node to execute operations comprising:
measuring a third signal on a first resource, to obtain a first interference power, wherein a first signal sent by a transmit node on the first resource is superimposed on the third signal, and a transmit power of the first signal is non-zero, wherein the transmit node is first user equipment in a first cell;
measuring a fourth signal on a second resource, to obtain a second interference power, wherein the first interference power and the second interference power are used to obtain an interference power of the transmit node on the receive node, wherein the transmit node sends no signal on the second resource; and
receiving resource configuration information from a fourth network device in the second cell, wherein the receiving resource configuration information instructs the receive node to measure the third signal on the first resource and measure the fourth signal on the second resource.

8. The receive node according to claim 7, wherein the first cell and the second cell are a same cell.

9. The receive node according to claim 7, wherein the resource configuration information is user equipment-specific information, or user equipment group-specific information, or cell-specific information; and in response to the receiving resource configuration information being user equipment-specific information or user equipment group-specific information, the resource configuration information comprises physical layer downlink control information or Radio Resource Control signaling; or in response to resource configuration information being cell-specific information, the receiving resource configuration information comprises physical layer downlink control information, or Radio Resource Control signaling, or a system broadcast message.

* * * * *